(12) United States Patent
Newland (10) Patent No.: US 12,461,434 B1
(45) Date of Patent: Nov. 4, 2025

(54) LASER PROJECTOR FOR PRODUCING GRID/DOT LINES

(71) Applicant: Daweet Newland, Markham (CA)

(72) Inventor: Daweet Newland, Markham (CA)

( * ) Notice: Subject to any disclaimer, the term of this patent is extended or adjusted under 35 U.S.C. 154(b) by 508 days.

(21) Appl. No.: 17/978,278

(22) Filed: Nov. 1, 2022

(51) Int. Cl.
*G03B 21/20* (2006.01)
*G03B 21/14* (2006.01)

(52) U.S. Cl.
CPC ....... *G03B 21/2033* (2013.01); *G03B 21/145* (2013.01)

(58) Field of Classification Search
None
See application file for complete search history.

(56) References Cited

U.S. PATENT DOCUMENTS

| | | | |
|---|---|---|---|
| 8,307,562 B2 | 11/2012 | Bascom | |
| 9,103,668 B2 | 8/2015 | Smith | |
| 10,119,817 B2 | 11/2018 | Spaulding | |
| 10,844,561 B2 | 11/2020 | Kimura | |
| 11,125,557 B1 | 9/2021 | Riley | |
| D942,875 S | 2/2022 | Shao | |
| 11,320,264 B2 | 5/2022 | Melton | |
| 2013/0335531 A1 | 12/2013 | Lee | |
| 2019/0120450 A1* | 4/2019 | Chien | F21V 13/02 |

* cited by examiner

*Primary Examiner* — Toan Ton
*Assistant Examiner* — Danell L Owens
(74) *Attorney, Agent, or Firm* — Kyle A. Fletcher, Esq.

(57) ABSTRACT

The laser projector for producing grid/dot lines is a display device. The laser projector for producing grid/dot lines is a lamp. The laser projector for producing grid/dot lines is a projector. The laser projector for producing grid/dot lines projects an image on a target surface. The image projected by the laser projector for producing grid/dot lines is selected from the group consisting of a grid/dot line pattern and a line grid pattern. The laser projector for producing grid/dot lines comprises a housing structure and an illumination circuit. The housing structure contains the illumination circuit. The illumination circuit generates and projects the grid/dot line pattern on the target surface.

12 Claims, 5 Drawing Sheets

LASER PROJECTOR FOR PRODUCING GRID/DOT LINES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of surveying instruments or accessories not provided for in groups G01C1/00-G01C13/00. (G01C15/00)

SUMMARY OF INVENTION

The laser projector for producing grid/dot lines is a display device. The laser projector for producing grid/dot lines is a lamp. The laser projector for producing grid/dot lines is a projector. The laser projector for producing grid/dot lines projects an image on a target surface. The image projected by the laser projector for producing grid/dot lines is selected from the group consisting of a grid/dot line pattern and a line grid pattern. The laser projector for producing grid/dot lines comprises a housing structure and an illumination circuit. The housing structure contains the illumination circuit. The illumination circuit generates and projects the grid/dot line pattern on the target surface.

These together with additional objects, features and advantages of the laser projector for producing grid/dot lines will be readily apparent to those of ordinary skill in the art upon reading the following detailed description of the presently preferred, but nonetheless illustrative, embodiments when taken in conjunction with the accompanying drawings.

In this respect, before explaining the current embodiments of the laser projector for producing grid/dot lines in detail, it is to be understood that the laser projector for producing grid/dot lines is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the laser projector for producing grid/dot lines.

It is therefore important that the claims be regarded as including such equivalent construction insofar as they do not depart from the spirit and scope of the laser projector for producing grid/dot lines. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
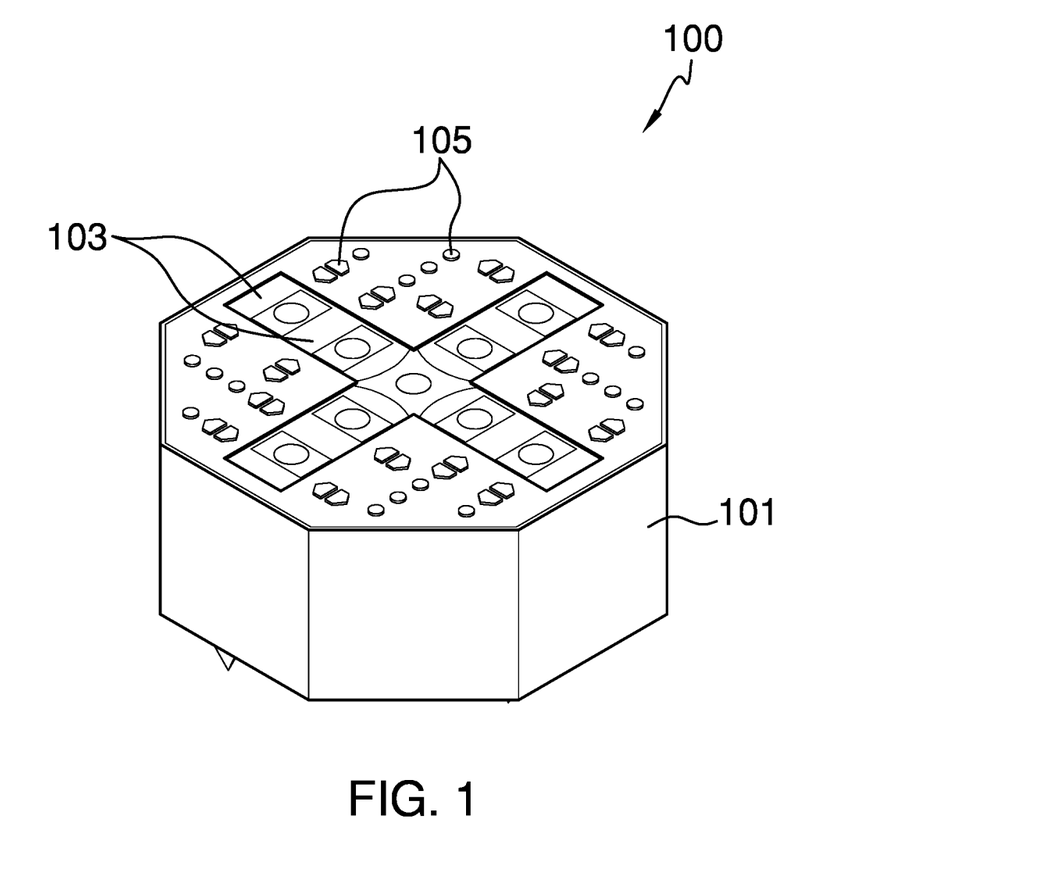
FIG. 1 is a perspective view of an embodiment of the disclosure.
Figure 2:
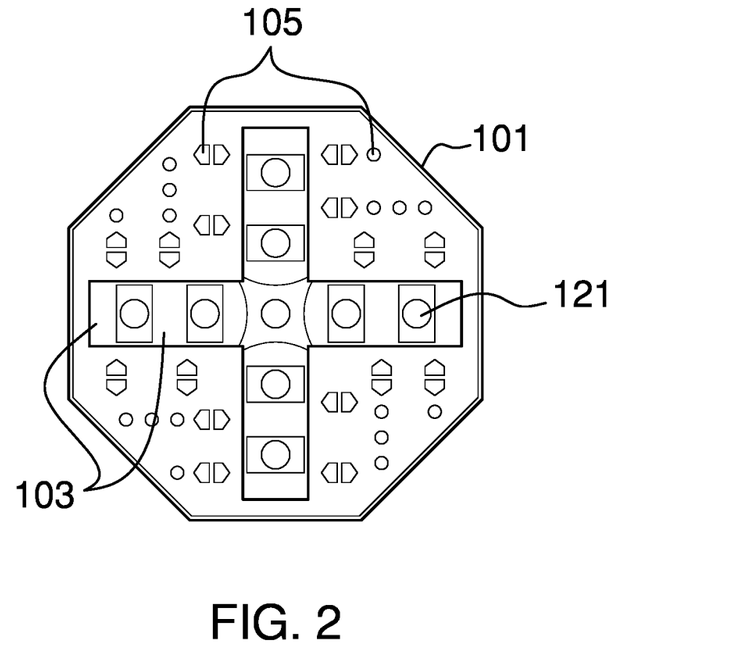
FIG. 2 is a top view of an embodiment of the disclosure.
Figure 3:
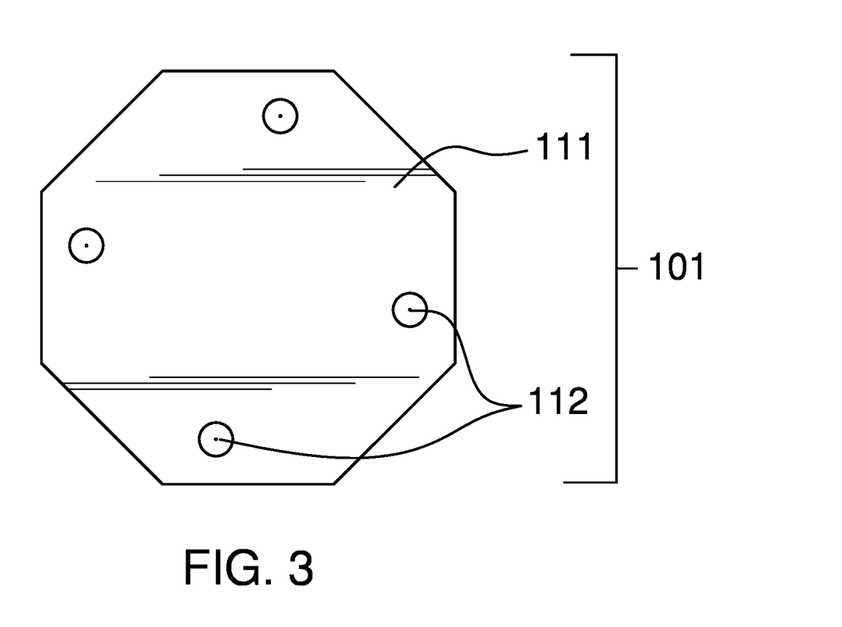
FIG. 3 is a bottom view of an embodiment of the disclosure.
Figure 4:
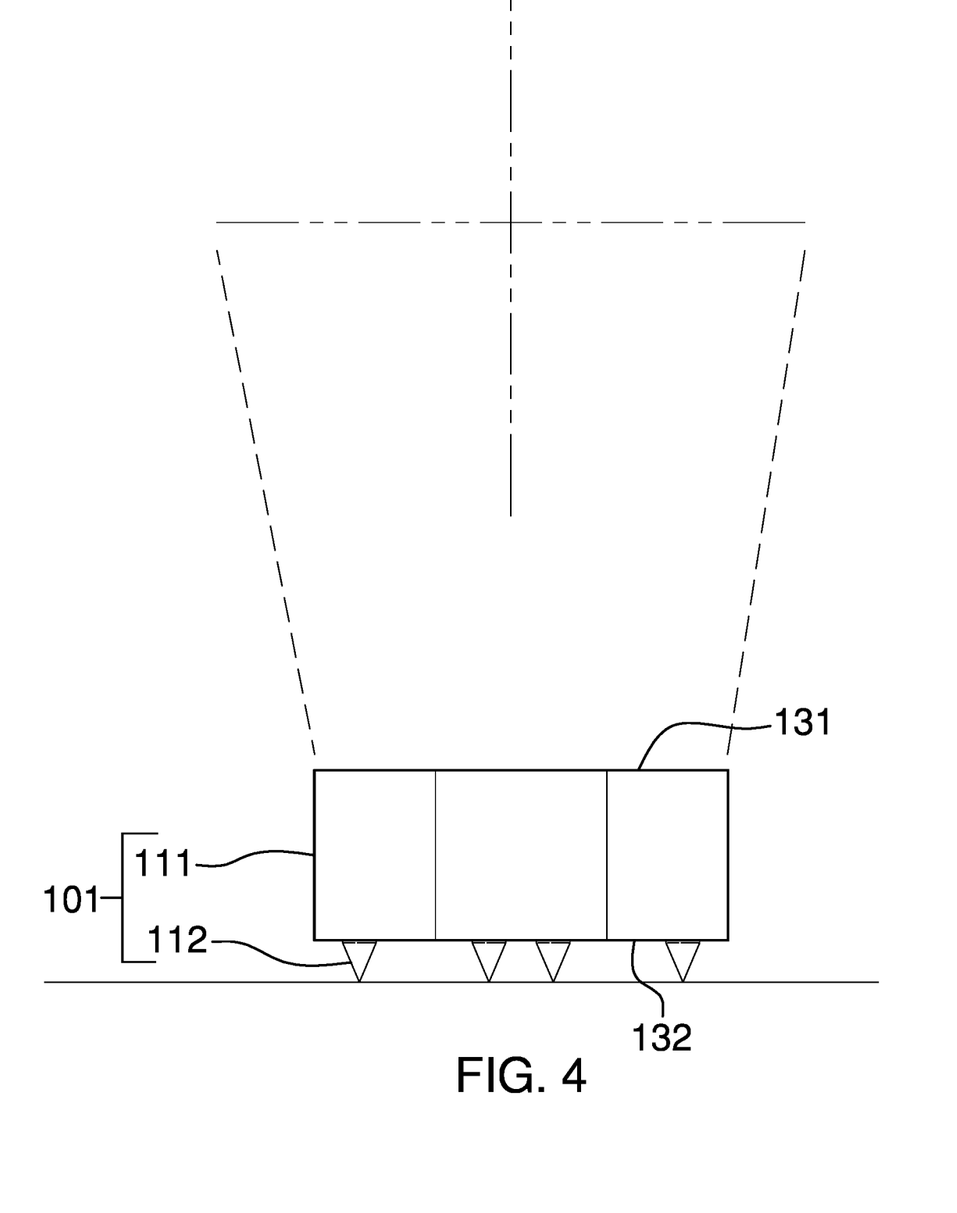
FIG. 4 is a side view of an embodiment of the disclosure.
Figure 5:
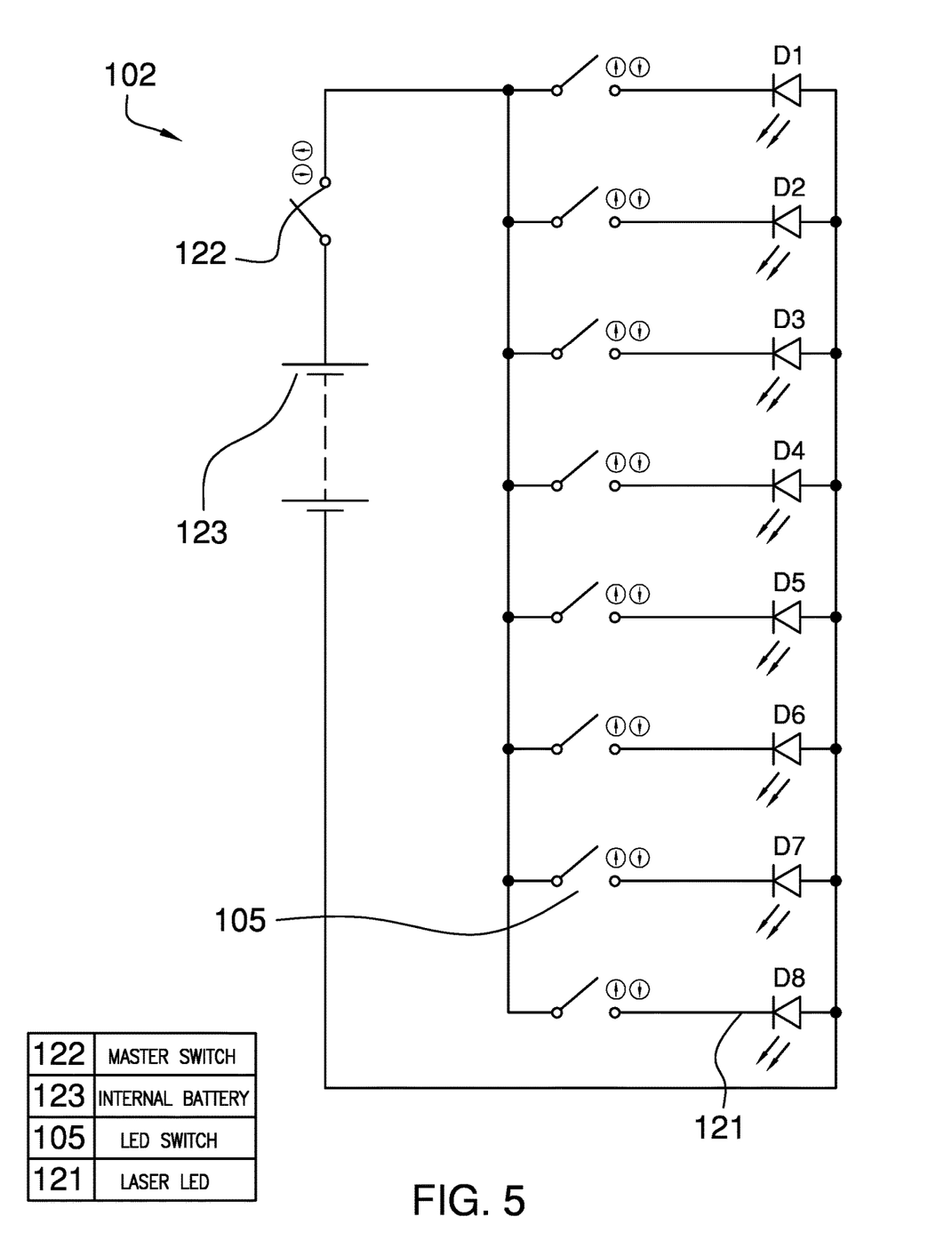
FIG. 5 is a schematic view of an embodiment of the disclosure.
Figure 6:
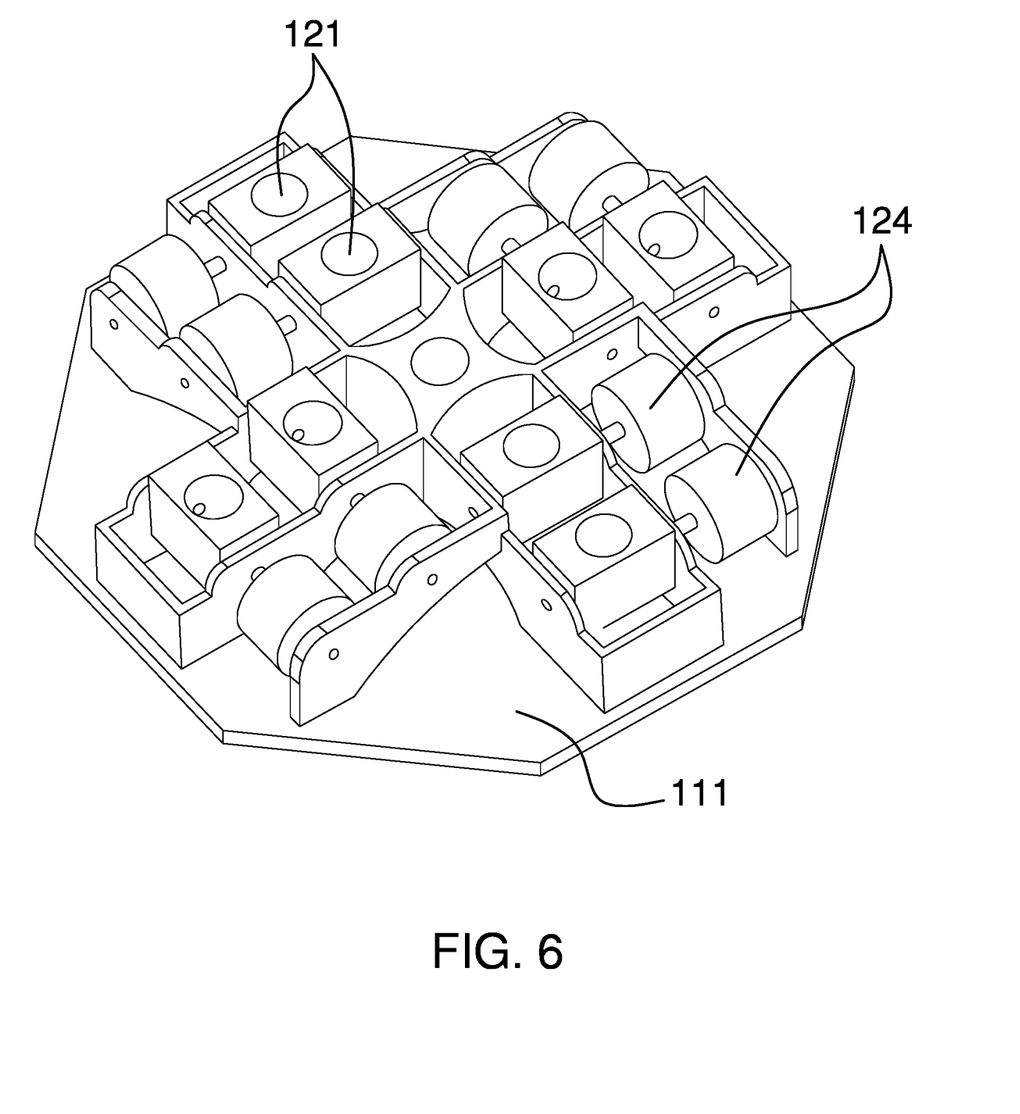
FIG. 6 is a detail view of an embodiment of the disclosure.

Detailed reference will now be made to one or more potential embodiments of the disclosure, which are illustrated in FIGS. 1 through 6.

The laser projector for producing grid/dot lines 100 (hereinafter invention) is a display device. The invention 100 is a lamp. The invention 100 is a projector. The invention 100 projects an image on a target surface. The image projected by the invention 100 is selected from the group consisting of a dot grid pattern and a line grid pattern. The invention 100 comprises a housing structure 101 and an illumination circuit 102. The housing structure 101 contains the illumination circuit 102. The illumination circuit 102 generates and projects the grid/dot line pattern on the target surface.

The housing structure 101 is a rigid structure. The housing structure 101 contains the illumination circuit 102. The housing structure 101 further comprises a protective lens 103. The protective lens 103 forms a transparent barrier structure that: a) allows for the visibility of the light generated by the illumination circuit 102 from the exterior of the housing structure 101; and, b) provides access to a plurality of switches 105 that are used to manually control the illumination circuit 102. The housing structure 101 is formed with all apertures and form factors necessary to allow the housing structure 101 to accommodate the use and operation of the illumination circuit 102. The housing structure 101 comprises a shell structure 111 and a pedestal structure 112. The pedestal structure 112 attaches to the shell structure 111.

The shell structure 111 is a disk shaped structure. The shell structure 111 is a rigid structure. The shell structure 111 contains the illumination circuit 102 including a plurality of laser LEDs 121 and a plurality of actuators 124. The shell structure 111 is formed with all apertures and form factors necessary to allow the shell structure 111 to accommodate the use and operation of the illumination circuit 102. The shell structure 111 comprises a display congruent end 131 and a base congruent end 132.

The display congruent end 131 is a congruent end of the disk structure of the shell structure 111. The display congruent end 131 is the surface of the shell structure 111 with the greatest surface area. The display congruent end 131 forms the surface of the shell structure 111 from which the grid/dot line pattern is projected. The display congruent end 131 forms the surface of the shell structure 111 from which the master switch 122 is accessed. The base congruent end 132 is a congruent end of the disk structure of the shell structure 111. The base congruent end 132 is the surface of the shell structure 111 that is distal from the display congruent end 131. The base congruent end 132 forms the surface of the shell structure 111 on which the pedestal structure 112 mounts.

The pedestal structure 112 is a load bearing structure. The pedestal structure 112 mounts on the base congruent end 132 of the shell structure 111. The pedestal structure 112 transfers the load of the invention 100 to a supporting surface.

The illumination circuit 102 is an electric circuit. The illumination circuit 102 is a lamp circuit that forms a portion of the internal electric circuit. The illumination circuit 102 generates electromagnetic radiation. The electromagnetic radiation generated by the illumination circuit 102 forms a grid/dot line pattern. The grid/dot line pattern is defined elsewhere in this disclosure. The illumination circuit 102 projects the electromagnetic radiation that forms the grid/dot line pattern onto a target surface. The illumination circuit 102 comprises a plurality of laser emitting LEDs 121, a master switch 122, a plurality of switches 105, a plurality of actuators 124, and an internal power source 123. Each actuator selected from the plurality of actuators 124 is associated with a laser emitting LED selected from the plurality of laser emitting LEDs 121. The plurality of laser emitting LEDs 121, the master switch 122, and the internal power source 123 are electrically connected. The plurality of laser emitting LEDs 121, the master switch 122, and the internal power source 123 are electrically interconnected. Each actuator selected from the plurality of actuators 124 is associated with a laser emitting LED selected from the plurality of laser emitting LEDs 121. Each actuator selected from the plurality of actuators 124 controls the direction of the light emitted from its associated laser emitting LED.

Each laser emitting LED selected from the plurality of laser emitting LEDs 121 is an LED. Each selected laser emitting LED generates a laser that forms a point of the grid/dot line pattern that is projected on the target surface of the invention 100. Each laser emitting LED selected from the plurality of laser emitting LEDs 121 mounts in the display congruent end 131 of the shell structure 111 such that the laser generated by each selected laser emitting LED is visible in the environment surrounding the housing structure 101.

Each laser emitting LED selected from the plurality of laser emitting LEDs 121 is associated with an actuator selected from the plurality of actuators 124. Each actuator selected from the plurality of actuators 124 controls the movement of its associated laser emitting LED. The movement of each laser emitting LED selected from the plurality of laser emitting LEDs 121 is independently controlled by its associated actuator. The independent movement of each laser emitting LED allows for the adjustment of the of the spacing between the grid/dot lines that are projected from the invention 100.

The illumination of each laser emitting LED selected from plurality of laser emitting LEDs is controlled through the plurality of switches 105. The plurality of switches 105 can: a) independently control the illumination of each selected laser emitting LED; and, b) illuminate simultaneously illuminate the entire plurality of laser emitting LEDs 121.

The master switch 122 is an electric switch. The master switch 122 is a maintained switch. The master switch 122 controls the flow of electric energy through the illumination circuit 102 formed by the plurality of laser emitting LEDs 121, the master switch 122, the plurality of switches 105, the plurality of actuators 124, and the internal power source 123. The master switch 122 enables and disables the operation of the illumination circuit 102.

The internal power source 123 is a source of electric energy.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Color: As used in this disclosure, a color refers to the visible portion of the spectrum that is reflected off of an object that is exposed to an external source of electromagnetic radiation. A color is often referred to as a shade.

Color Spectrum: As used in this disclosure, a color spectrum refers to organization of ranges visible electromagnetic radiation into specific colors. Within this disclosure: a) electromagnetic radiation with wavelengths of 380 nm to 450 nm are called violet; b) electromagnetic radiation with wavelengths of 450 nm to 485 nm are called blue; c) electromagnetic radiation with wavelengths of 485 nm to 500 nm are called cyan; d) electromagnetic radiation with wavelengths of 500 nm to 565 nm are called green; e) electromagnetic radiation with wavelengths of 565 nm to 590 nm are called yellow; f) electromagnetic radiation with wavelengths of 590 nm to 625 nm are called orange; and, g) electromagnetic radiation with wavelengths of 625 nm to 740 nm are called red.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Electromagnetic Radiation: As used in this disclosure, electromagnetic radiation refers to an interaction between electric fields and magnetic fields that is capable of transmitting energy through a vacuum.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Field of Illumination: As used in this disclosure, a field of illumination refers to an area illuminated by electromagnetic radiation projected from an electrical device such as a lamp or transmission antenna.

Footing: As used in this disclosure, a footing refers to one of a plurality of small pedestals that combine to: a) raise an object above a supporting surface; and, b) transfer the load path of the object to the supporting surface.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grid: As used in this disclosure, a grid is a network of intersecting parallel and perpendicular lines. The rectangular space within a grid that is bounded by two adjacent parallel lines and two adjacent parallel lines is called a cell. A grid/dot line pattern refers to a grid that is represented by an image that displays only the points of intersection formed at the intersection of each parallel and perpendicular line that forms the grid.

Housing: As used in this disclosure, a housing is a rigid structure that encloses and protects one or more devices.

Hue: As used in this disclosure, a hue refers to a specific color.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Interior: As used in this disclosure, the interior is used as a relational term that implies that an object is contained within the boundary of a structure or a space.

Lamp: As used in this disclosure, a lamp is an electrical circuit that generates electromagnetic radiation.

Laser: As used in this disclosure, a laser is an electrical device used to generate monochromatic electromagnetic radiation. By monochromatic is meant that the generated photons forming the electromagnetic radiation all have the same wavelength.

LED: As used in this disclosure, an LED is an acronym for a light emitting diode. A light emitting diode is a diode that is also a light source.

Light: As used in this disclosure, light refers to electromagnetic radiation that illuminates an area. Illumination is a synonym for light, particularly in cases where a measure of the amount of light in a space is called for.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Project: As used in this disclosure, the term project refers to something that extends beyond the boundaries of a material object, an immaterially Projector: As used in this disclosure, a projector is a device that uses light and a lens system to project an image on a surface.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Rigid Structure: As used in this disclosure, a rigid structure is a solid structure formed from an inelastic material that resists changes in shape. A rigid structure will permanently deform as it fails under a force.

Spectrum: As used in this disclosure, a spectrum refers to the distribution and amplitude of the component frequencies of a source of electromagnetic radiation. Spectrums are typically organized and displayed by frequency or frequency range.

Wave: As used in this disclosure, a wave is a mechanism capable of transferring energy without transferring mass. Specifically, a wave refers to a transfer of momentum or energy through an object or medium such that there is no significant change in the relative positions of the particles (or molecules) that make up the object or medium.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A laser projector for producing grid/dot lines comprising
    a housing structure and an illumination circuit;
    wherein the housing structure contains the illumination circuit;
    wherein the illumination circuit comprises a plurality of laser emitting LEDs, a master switch, a plurality of switches, a plurality of actuators, and an internal power source;
    wherein the plurality of laser emitting LEDs, the master switch, the plurality of switches and the internal power source are electrically connected;
    wherein each actuator selected from the plurality of actuators is associated with a laser emitting LED selected from the plurality of laser emitting LEDs;
    wherein each selected actuator controls the direction of the light emitted from its associated selected laser emitting LED;
    wherein each switch selected from the plurality of switches is associated with a laser emitting LED selected from the plurality of laser emitting LEDs;
    wherein each selected switch controls the illumination of the light emitted from its associated selected laser emitting LED;
    wherein the plurality of laser emitting LEDs, the master switch, and the internal power source are electrically connected;
    wherein the housing structure comprises a shell structure and a pedestal structure;
    wherein the pedestal structure transfers the load of the laser projector for producing grid/dot lines to a supporting surface.

2. The laser projector for producing grid/dot lines according to claim 1
    wherein the laser projector for producing grid/dot lines is a display device;
    wherein the laser projector for producing grid/dot lines is a lamp;
    wherein the laser projector for producing grid/dot lines is a projector;
    wherein the laser projector for producing grid/dot lines projects an image on a target surface;
    wherein the image projected by the laser projector for producing grid/dot lines is a grid/dot line pattern.

3. The laser projector for producing grid/dot lines according to claim 2 wherein the illumination circuit generates and projects the grid/dot line pattern on the target surface.

4. The laser projector for producing grid/dot lines according to claim 3 wherein the housing structure is a rigid structure.

5. The laser projector for producing grid/dot lines according to claim 4
    wherein the illumination circuit is an electric circuit;
    wherein the illumination circuit is a lamp circuit;
    wherein the illumination circuit generates electromagnetic radiation;

wherein the illumination circuit projects the electromagnetic radiation that forms the grid/dot line pattern onto a target surface.

6. The laser projector for producing grid/dot lines according to claim 5
wherein the pedestal structure attaches to the shell structure.

7. The laser projector for producing grid/dot lines according to claim 6
wherein the shell structure is a disk shaped structure;
wherein the shell structure is a rigid structure;
wherein the shell structure contains the illumination circuit.

8. The laser projector for producing grid/dot lines according to claim 7
wherein the shell structure comprises a display congruent end and a base congruent end;
wherein the display congruent end is a congruent end of the disk structure of the shell structure;
wherein the display congruent end is the surface of the shell structure with the greatest surface area;
wherein the display congruent end forms the surface of the shell structure from which the grid/dot line pattern is projected;
wherein the base congruent end is a congruent end of the disk structure of the shell structure;
wherein the base congruent end is the surface of the shell structure that is distal from the display congruent end;
wherein the base congruent end forms the surface of the shell structure on which the pedestal structure mounts.

9. The laser projector for producing grid/dot lines according to claim 8
wherein the pedestal structure is a load bearing structure.

10. The laser projector for producing grid/dot lines according to claim 9,
wherein each laser emitting LED selected from the plurality of laser emitting LEDs is an LED;
wherein each selected laser emitting LED generates a laser that forms a point of the grid/dot line pattern that is projected on the target surface of the laser projector for producing grid/dot lines;
wherein each laser emitting LED selected from the plurality of laser emitting LEDs mounts in the display congruent end of the shell structure such that the laser generated by each selected laser emitting LED is visible in the environment surrounding the housing structure.

11. The laser projector for producing grid/dot lines according to claim 10
wherein the master switch is an electric switch;
wherein the master switch is a maintained switch;
wherein the master switch controls the flow of electric energy through the illumination circuit.

12. The laser projector for producing grid/dot lines according to claim 11 wherein the internal power source is an externally provided source of electric energy.

* * * * *